Feb. 9, 1971           J. L. ZAR           3,562,685
FOIL WRAPPED SUPERCONDUCTING MAGNET
Original Filed Sept. 28, 1967
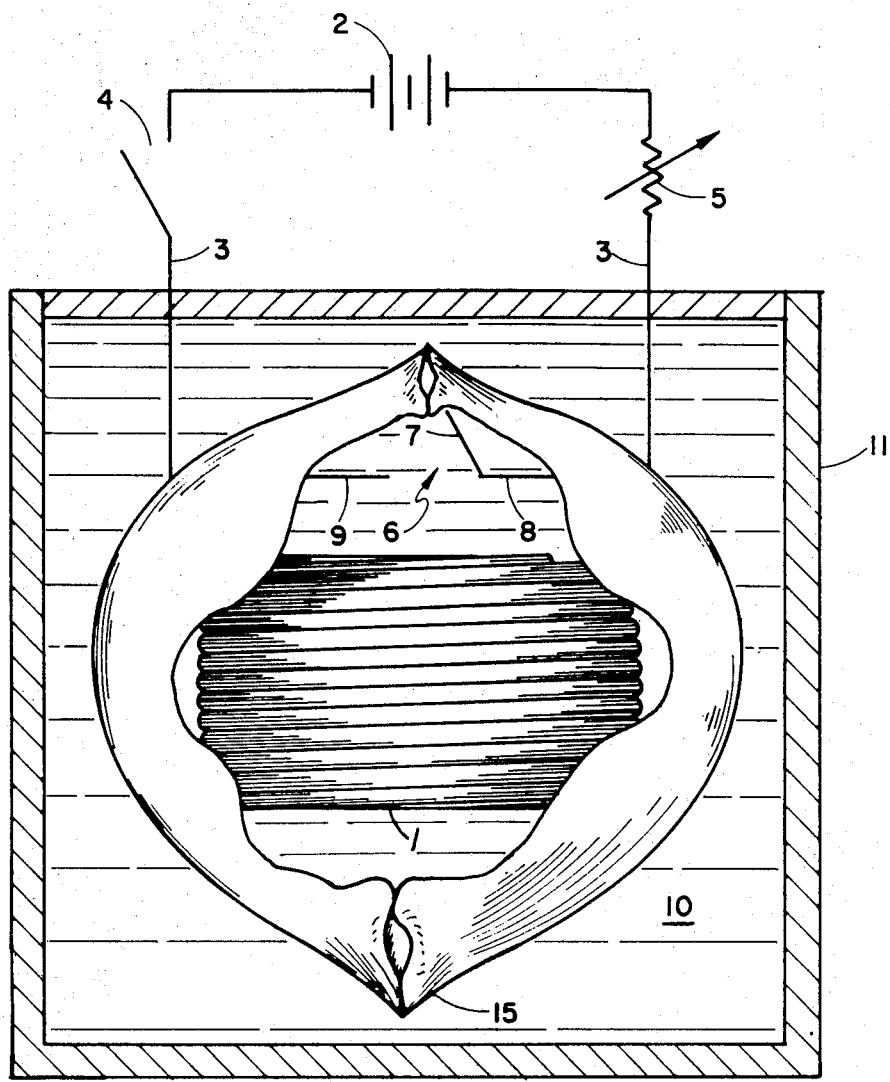
JACOB L. ZAR
*INVENTOR.*
BY *Charles M. Hogan*
*Melvin E. Frederick*
ATTORNEYS United States Patent Office 3,562,685
Patented Feb. 9, 1971

1

3,562,685
FOIL WRAPPED SUPERCONDUCTING MAGNET
Jacob L. Zar, North Andover, Mass., assignor to Avco Corporation, Cincinnati, Ohio, a corporation of Delaware
Original application Sept. 28, 1967, Ser. No. 671,441, now Patent No. 3,530,682, dated Sept. 29, 1970. Divided and this application June 24, 1969, Ser. No. 844,244
Int. Cl. H01f 7/22
U.S. Cl. 335—216
2 Claims

ABSTRACT OF THE DISCLOSURE

A superconducting device and method of cooling same wherein the magnet is enclosed in a material that functions as a condensor during cool down of the device. During cool down, liquids, solid contaminants and the like condense on the condensor material during final cool down.

---

This is a division of application Ser. No. 671,441 filed Sept. 28, 1967.

The ability to not only provide high-strength magnetic fields but to effectively and safely provide such magnetic fields over an extended period of time is important in connection with solid state, plasma and particle physics research. In most cases heretofore, the need for high magnetic fields necessitated the use of pulsed fields or large amounts of power. However, with the advent of new superconducting materials, considerable interest has been aroused in the development of useful magnets of high field strength.

An example of the application of such magnets is the generation of electrical power, the generation of magnetic fields in outer space, plasma propulsion, large scale physics experiments and the like. Providing a continuous magnetic field of high field strength over a large volume is a formidable engineering task.

Broadly speaking, three types of field coils may be used to provide high-strength magnetic fields, namely, room temperature copper, cryogenic and superconducting field coils. Until recently, the only practical way to produce high-strength magnetic fields was by using water-cooled copper field coils with or without iron cores. This type of field coil has large power requirements.

Since the resistivity of pure metals decreases with temperature, Joule loss in field coils can be reduced by refrigeration. Although this approach requires that power be supplied to the refrigerator, it has been shown that the total power consumed by the refrigerator and a cryogenic field coil can be substantially reduced over that required by a comparable copper magnet operating at room temperature. However, operation of the refrigerator still represents a significant loss because Joule losses still exist in the coil.

Recent developments in high critical field superconductors have made possible the consideration of high field-strength superconducting field coils. The possibility of using superconductor field coils for providing 100 kilogauss or more with only minute refrigeration power requirements and no Joule losses represents obvious advantages for continuously operating power plants and the like.

The properties and characteristics of superconductors have been treated in such texts as "Superfluids," vol. 1, by Fritz London, published in 1950 in New York by John Wiley & Son, Inc. and "Superconductivity" by D. Shoenberg, published in 1952 in London by Cambridge University Press.

It has been known for many years that the resistance of metals decreases as a function of decreasing temperature until a given temperature of the order of 18° K. or below is reached, at which temperature electrical resistance very sharply vanishes for those materials which exhibit superconductivity. The temperature at which transition to zero resistance takes place in metals is referred to as the critical temperature and the state of a metal upon reaching zero resistance is referred to as the superconductive state. A metal or material that does not or cannot be made to exhibit zero resistance may be referred to as a nonsuperconductor or normal material.

The critical temperature of materials varies with different materials and for each material it is lowered as the intensity of the magnetic field around the material is increased from zero. Once a body of material is rendered superconductive, it may be restored to the resistive or normal state without changing its temperature by the application of a magnetic field of a given intensity to such materials. The magnetic field necessary to destroy superconductivity is called the critical field. Further, at a given magnetic field strength and temperature, a superconductive material may also be driven into its normal state by passing a current of a given magnitude through the material. The current necessary to destroy superconductivity is called the critical current.

Thus, superconductivity in a specific material may be destroyed by the application of energy to it in the form of heat so as to make such material reach its critical temperature, or in the form of a magnetic field so as to make it reach its critical field, or in the form of current so as to make it reach its critical current. It is important that one keep in mind that the critical temperature, field and current, are all interdependent.

Practical examples of superconducting materials to attain high fields are the compounds $Nb_3Sn$ and $V_3Ga$, alloys of niobium with zirconium, and alloys of niobium and titanium.

As used herein, the term "superconducting temperature of application" means the temperature at which a coil which exhibits superconducting characteristics is maintained during operation, the term "superconducting material" means a material that does or can be made to exhibit zero resistance, i.e., it has a useful and known critical temperature greater than the superconducting temperature of application, and the term "normal material" means a material that does not or cannot be made to exhibit zero resistance at the superconducting temperature of application.

It is an object of the invention to provide improved superconducting devices.

It is another object of the invention to provide superconducting devices having improved operating characteristics.

It is a further object of the invention to provide an improved method of cooling superconducting devices.

It is a still further object of the invention to provide a method of cooling superconductive devices wherein liquid, solid contaminants and the like that may be in such devices are caused to evaporate and be condensed on a surface external to the device.

The invention, both as to its organization and method of operation, will best be understood from the following description of specific embodiments when read in conjunction with the accompanying drawing which is a front elevational view partly in section of a superconducting magnet and is illustrative of one embodiment of the invention.

Referring now to the drawing, there is shown a superconducting coil 1 connected to an external power source such as battery 2, by means of leads 3, switch 4 and variable resistor 5. Resistor 5 permits the current to be varied if desired. Shunt 6 comprising switch 7 and leads 8 and 9 are connected across the terminal of coil 1. Coil 1 and shunt 6 are maintained at a temperature below the critical temperature of the superconducting material in coil 1 and shunt 6 by suspending them in a low temperature environment 10, such as helium contained in a Dewar flask 11.

Coil 1 may be formed of a superconductive wire material exhibiting the required critical field and superconductor characteristics for the intended use. Advantageously, superconducting coils are formed of a single strand of a superconducting wire. The conditions dictating the choice of the material for leads 3 are understood by the art. In general, those portions of leads 3 from shunt 6 to coil 1 are formed of a suitable superconducting wire material capable of sustaining the same current flow as the coil. Those portions of leads 3 from the external power source 4 to shunt 6 not suspended in the low temperature environment are advantageously formed of a low resistance material, such as copper, which exhibits a lower resistance than the typical superconducting material in a normal state. Persistent current may be established in coil 1 by opening switch 7 and closing switch 4 and varying resistor 5 to establish the desired current flow through coil 1. Thereafter, closing switch 7 and opening switch 4 will result in the establishment of a persistent current through the coil 1, shunt 6 and the interconnected portions of leads 3.

It is significant to note that coil 1 is loosely covered or enclosed by a covering 15 which may comprise a foil formed from a material such as aluminum, plastic or the like. The device, such as coil 1, need only be loosely wrapped in the foil 15 inasmuch as the foil functions as a condensor. Accordingly, the covering 15 should only substantially (but not completely) exclude the low temperature environment such as helium from the coil. Thus, in transferring a superconducting device from a precooling low temperature environment comprising liquid nitrogen, difficulties were encountered in the condensation of liquid nitrogen and liquid air on the device after it had been transferred from a nitrogen precooling bath to a Dewar containing liquid helium. The prevent these difficulties in accordance with the invention, the device, before being cooled, was loosely wrapped in aluminum foil. As previously noted, this foil during final cool down functions as a condensor. This foil being external of the device was of course cooled first and hence was the coldest part of the device. It was found that liquid and/or solid contaminants which were in and/or on the device evaporated and condensed on the foil.

In the use of superconducting magnets provided with interior cooling passages as shown and described, for example, in patent application Ser. No. 600,346, filed Nov. 23, 1966, there is a very great likelihood that entrained liquid air, liquid nitrogen, and the like will remain in these cooling passages and clog them or cover the exposed surfaces of the conductors which are intended to be cooled, thus interfering with the necessary transfer of heat. If the coil prior to being cooled is loosely wrapped in a foil comprised of metal, plastic, or the like in accordance with the present invention, this insures that the coil temperature will lag behind that of the environment surrounding it. Accordingly, evaporation will take place from the coil to the surface of the foil and will leave the coil clean rather than contaminated. The foil need not be removed after final cool down.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

What is claimed is:

1. In a superconducting magnetic field coil, the combination comprising:
    (a) a superconducting coil formed of a plurality of turns of a continuous superconducting conductor, said conductor exhibiting superconductive characteristics at about 4.2° K., said coil being adapted to be immersed in a low temperature environment having a temperature of about 4.2° K., while coupled to a source of electrical current; and
    (b) a wrapper material substantially loosely surrounding said coil, said wrapper material permitting communication between said coil and the environment surrounding said coil, said wrapper material being composed of a normal material.
2. The combination as defined in claim 1 wherein said wrapper material is a deformable metal foil.

References Cited

UNITED STATES PATENTS

| | | | |
|---|---|---|---|
| 3,173,079 | 3/1965 | McFee | 336—250UX |
| 3,273,092 | 9/1966 | Hnilicka | 335—216 |
| 3,428,926 | 2/1969 | Bogner et al. | 174—SCUX |
| 3,432,783 | 3/1969 | Britton et al. | 335—216 |

GEORGE HARRIS, Primary Examiner

U.S. Cl. X.R.,

174—15; 62—63